No. 811,210. PATENTED JAN. 30, 1906.
H. C. FRANK.
CUFF HOLDER.
APPLICATION FILED APR. 14, 1905.

Witnesses:
F. G. Hachenburg.
F. George Barry.

Inventor:
Henry C. Frank
by attorneys
Brown & Seward

UNITED STATES PATENT OFFICE.

HENRY C. FRANK, OF NEW YORK, N. Y.

CUFF-HOLDER.

No. 811,210. Specification of Letters Patent. Patented Jan. 30, 1906.

Application filed April 14, 1905. Serial No. 255,536.

*To all whom it may concern:*

Be it known that I, HENRY C. FRANK, a citizen of the United States, and a resident of the borough of Brooklyn, in the city and State of New York, have invented new and useful Improvements in Cuff-Holders, of which the following is a specification.

The object of my present invention is to provide certain improvements in that type of cuff-holder which comprises a shank having a shirt-sleeve-engaging clasp and a cuff-engaging hook, the invention being particularly directed to the novel formation of the cuff-retaining lug on the hook, whereby the lug is prevented from tearing the walls of the buttonholes of the cuff.

Figure 1:
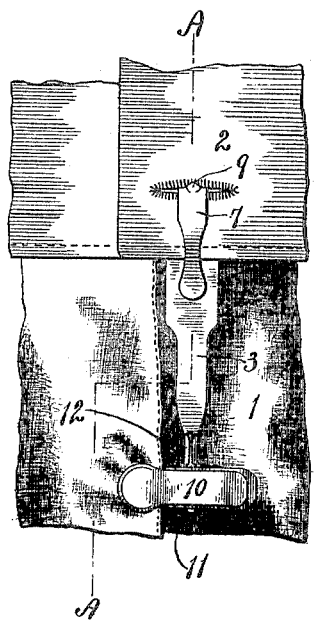
Figure 2:

In the accompanying drawings, Figure 1 is an outside view of adjacent portions of a shirt-sleeve and a separate cuff, showing my improved cuff-holder as in use; and Fig. 2 is a longitudinal section, taken in the plane of the line A A of Fig. 1, with the shirt-sleeve removed.

The shirt-sleeve is herein denoted by 1, and the cuff by 2. The shank of the cuff-holder is denoted by 3, and it is provided at its upper end with a cuff-engaging hook hinged at 4 to the shank, which hook comprises an upwardly-extended portion 5, a laterally-extended portion 6, and a downwardly-extended portion 7. The hook is yieldingly held closed by means of a spring-tongue 8 cut in the shank 3. A lug 9 is punched from the metal of the hook at the outer end of the laterally-extended portion 6, which lug 9 is not severed at any point from the body of the hook, but is of rounded form, so as to permit it to be forced through the buttonholes in the cuff in both directions without danger of cutting the walls of the buttonholes. This lug 9 serves to retain the two flaps of the cuff in proper position upon the hook. The lower end of the shank 3 has pivoted thereto a shirt-sleeve-engaging clasp 10, the hinge-pintle 11 of which is attached to the lower end of the shank in the present instance by folding the sides of the shank around the pintle, as shown at 12.

What I claim is—

1. A cuff-holder comprising a shank having a shirt-sleeve-engaging clasp and a cuff-engaging hook, the said cuff-engaging hook being provided with a rounded retaining-lug struck but not separated from the body of the hook.

2. A cuff-holder comprising a shank having a shirt-sleeve-engaging clasp and a cuff-engaging hook, the said cuff-engaging hook being hinged to the shank and comprising an upwardly-extended portion, a laterally-extended portion and a downwardly-extended portion and a lug struck from the body of the hook at the outer end of its laterally-extended portion, said lug being formed without severing any portion of the same from the body of the hook.

In testimony that I claim the foregoing as my invention I have signed my name, in presence of two witnesses, this 10th day of April, 1905.

HENRY C. FRANK.

Witnesses:
    FREDK. HAYNES.
    C. S. SUNDGREN.